Oct. 16, 1923.  1,470,958
E. G. CHANDLER
RAILROAD TRUCK
Filed Dec. 14, 1922    2 Sheets-Sheet 1
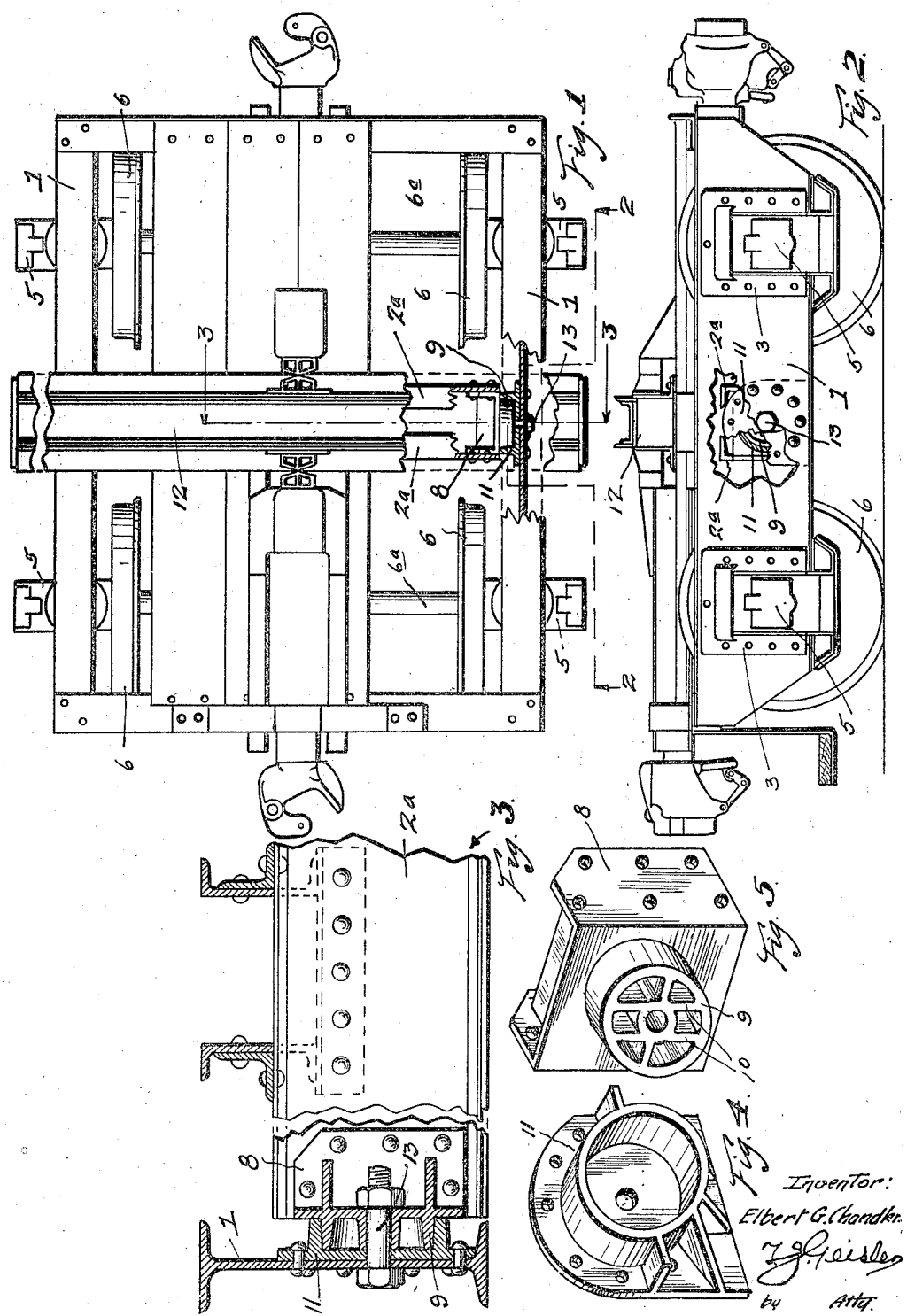

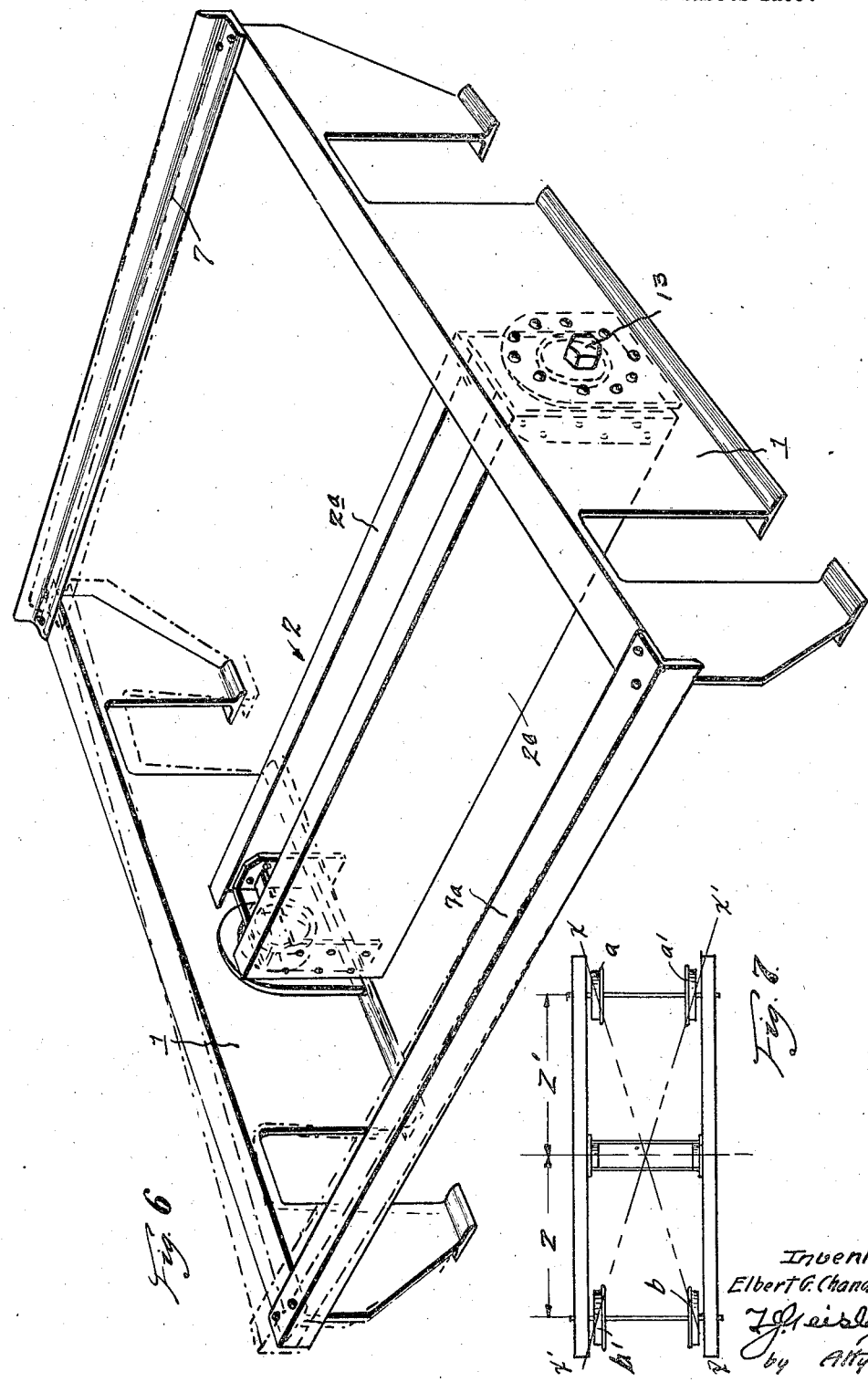

Patented Oct. 16, 1923.

1,470,958

UNITED STATES PATENT OFFICE.

ELBERT G. CHANDLER, OF PORTLAND, OREGON.

RAILROAD TRUCK.

Application filed December 14, 1922. Serial No. 606,875.

*To all whom it may concern:*

Be it known that I, ELBERT G. CHANDLER, a citizen of the United States, and a resident of Portland, county of Multnomah, and State of Oregon, have invented a new and useful Improvement in Railroad Trucks, of which the following is a specification.

My invention relates to railroad trucks, but more especially to logging trucks having an H-shaped supporting frame mounted on four wheels.

It is well known that frames of these trucks, while passing over uneven track sections—for example when one of the wheels passes over a point in such section, which is slightly lower than the other surfaces of that section—are distorted and wrenched by the torque about those axes extending between the diagonally located wheels. In other words referring to the diagram Fig. 7 of the accompanying drawings: If the wheel $a$ passed over a spot which was slightly lower than the surfaces supporting the other wheels, the entire weight carried by the truck would be supported for that instant by the wheels $a'$ and $b'$, and the frame would be distorted and wrenched about the axis $x'$—$x'$; or if the wheel $a'$ were the one passing over the lower point, the wheels $a$ and $b$ would support the entire weight and the truck frame would be distorted about the axis $x, x$; and such distortion and wrenching tends to spring or rupture the truck-frame.

The object of my invention is, therefore, to provide a truck frame which is adapted to take care of the said condition without injury to the truck frame.

I attain my object in a truck composed of an H-shaped wheel mounted base or frame, comprising two rigid side members connected together by a load carrying bolster or member which is pivotally supported between said side members, on an axis extending transversely thru the longitudinal middle of the latter.

This construction adapts the truck frame to accommodate said distortion by permitting the side members to be rotated slightly relatively to each other about the axis of the load carrying member by which they are connected.

The details of my invention, and incidental features I have illustrated in the accompanying drawings, in which:

Fig. 1 is a plan view of a logging truck with parts broken away to illustrate how the load carrying member or bolster may be pivotally connected to the side frames;

Fig. 2 is a side elevation with parts broken away to show details of construction the plane of vision being approximately indicated by the line 2—2 of Fig. 1;

Fig. 3 is a fragmentary section taken on the line 3—3 of Fig. 1;

Fig. 4 is a perspective view of the socket half of the pivoted connection by which the bolster is pivotally connected to the side frames;

Fig. 5 shows the cap which fits over the end of the bolster and has a trunnion portion which is adapted to fit in the socket shown in Fig. 4;

Fig. 6 is a perspective view of the frame of the logging truck and shows how the side frames may be rotated in relation to each other; and Fig. 7 is a diagrammatic view of the H-shaped frame in my logging truck.

The truck embodying my invention is made up of side frames 1 which are connected together by a transverse load carrying member or bolster 2 which is pivotally supported between these side members on an axis extending transversely thru the longitudinal middle of the side frames. The side frames and the bolster constitute substantially an H-shaped frame and carry the entire load supported by the truck. The side members have pedestal castings 3 which are mounted on the side frames 1. Boxings 5 are fitted in these pedestal castings and wheels 6 with their integral axles $6^a$ are journaled in these boxings and support the frame. Flexible angle sections 7 and $7^a$ are fastened across the ends of the side members so as to hold them in spaced relationship and also to form a platform on top of the truck. These angles 7, $7^a$ are of relatively light cross section and are very flexible in relation to the bolster and side members and thus the members may rotate slightly about the pivoted connections with the bolster. The bolster is preferably provided with a cap 8 on each end but may be made with a cap on one end only, that is, the bolster may be pivoted at one end but is preferably pivoted at both ends. The cap has a trunnion portion 9 which is preferably made hollow with ribs 10 across for stiffening. A socket piece 11 is fastened to one or both of the side frames 1, whichever the case might be, and is adapted to receive the trunnion 9 as shown in Fig. 3.

The trunnion 9 is held in its seat in the socket 11 by the bolt 13 being fastened thru their middles and thru the side member thus tending to prevent the pivoted connections from being forced out of their relative positions.

The bolster is preferably made of two channel or I-beam sections 2ᵃ which are fastened together in spaced relationship thru the caps 8, the inner surfaces of these structural members 2ᵃ being fastened to the outside of the caps, 8. The ordinary truck bunk 12 bears on the approximate middle of the bolster and the entire load carried by the truck is therefore transmitted to the frame thru the bunk.

My invention is adaptable to any type of railroad truck and thus the truck shown is merely one adaptation and is standard thruout except for my invention and therefore the parts which go to make up the truck are not claimed nor described.

The relationship of the separate parts and members to each other are as follows: The load carried by the truck is supported substantially in its entirety by the bunk 12 which in turn is supported by the transverse load carrying member or bolster. The bolster is pivotally connected to one or both side frames which are in turn supported by the wheels on the track. As long as the wheels are all in the same horizontal plane the load carried by the truck is equally supported by each of the four wheels. If, however, one of the wheels strikes a depression in the track the load will not at that instant be supported by this wheel. Ordinarily if the frame were rigid the load would be carried by two of the remaining three wheels which are located at the ends of the frame diagonally opposite each other. Thus for instance in Fig. 7, if the wheel $a$ were passing over a section of the track slightly lower than the sections over which the wheels $a'$ and $b'$ were passing the load would be carried at that instant by the wheels $a$ and $b$. The ends of the frame supported by the wheels $a'$ and $b'$ would then tend to sag until they would tend to support an equal load to the load supported by the wheels $a$ and $b$. This would cause a slight distortion about the line $x—x$, across the frame and this repeated strain would after a time cause a fracture of the material. In the truck shown in the accompanying drawings, however, if one of the wheels strikes a spot slightly lower than the sections supporting the other three wheels, that wheel is free to move downward with the track because the side frame is allowed to rotate relatively to the opposite side frame and therefore all of the load will be supported between the side members at approximately their longitudinal middle so that the distances $z$ and $z'$ in Fig. 7 are substantially equal and thus the depressing of any of the wheels has an equal effect to produce this rotation. The structural members 7 and 7ᵃ do not tend to resist this rotation because they are relatively light in cross section and are in no means load carrying members but are merely ties to hold the ends of the side frames in spaced relationship. The axles also do not act as connections between the side members but are journaled in boxes which have a slidable relationship with the side frames. Thus the axles, also, do not tend to resist the rotation about the pivoted connection between the bolsters and the side frames. It is to be understood that one side only of the bolster may be pivotally connected with one side frame and the other fixed to the opposite frame. This would permit the side frames to rotate in relation to each other, almost as well in practical operation as when the bolster is pivoted at both ends.

I claim:

1. In a truck, a wheel-mounted frame, comprising two rigid side members, transverse members connecting the side members at their ends, a transverse load-carrying member connecting the side members at their longitudinal middle, said load-carrying member having one of its ends pivotally connected to the adjacent side member, thereby permitting the rotation of said side members, relatively to each other, about the longitudinal axis of said load-carrying member, said transverse end members being adapted to accommodate the said rotation of said side members.

2. In a truck, a wheel-mounted frame, comprising two rigid side members, angle irons connecting the side members at their ends, a transverse load-carrying member connecting the side members at their longitudinal middle, said load-carrying member having one of its ends pivotally connected to the adjacent side member, thereby permitting the rotation of said side members, relatively to each other, about the longitudinal axis of said load-carrying member, said angle irons being adapted to accommodate the said rotation of said side members.

3. In a truck, a wheel-mounted frame, comprising two rigid side members, transverse members connecting the side members at their ends, a transverse load-carrying member connecting the side members at their longitudinal middle, one end of the load carrying member and the adjacent side member being provided with a socket and trunnion respectively thereby permitting the rotation of said side members, relatively to each other, said transverse end members being adapted to accommodate the said rotation of said side members.

4. In a truck, a wheel-mounted frame, comprising two rigid side members, transverse members connecting the side members at their ends, a transverse load-carrying member connecting the side members at their longitudinal middle, a socket plate provided on the inner face of one of said side members, and the adjacent end of the load-carrying member being provided with a trunnion bearing in said socket thereby permitting the rotation of said side members, relatively to each other, said transverse end members being adapted to accommodate the said rotation of said side members.

ELBERT G. CHANDLER.